United States Patent [19]
Boisvert et al.

[11] Patent Number: 5,972,512
[45] Date of Patent: Oct. 26, 1999

[54] SILICONE RESIN COMPOSITES FOR FIRE RESISTANCE APPLICATIONS AND METHOD FOR FABRICATING SAME

[75] Inventors: Ronald Paul Boisvert, Midland, Mich.; Gary Thomas Burns, Ohain, Belgium; Timothy Chi-Shan Chao, Midland, Mich.; Dimitris Elias Katsoulis, Midland, Mich.; Satyendra Kumar Sarmah, Midland, Mich.

[73] Assignee: Dow Corning Corporation, Midland, Mich.

[21] Appl. No.: 09/024,978

[22] Filed: Feb. 16, 1998

[51] Int. Cl.$^6$ .................................................. C08L 83/04
[52] U.S. Cl. ...................... 428/409; 428/142; 428/172; 428/408; 428/920; 428/921; 428/221; 556/450
[58] Field of Search ........................ 556/450; 428/408, 428/920, 921, 142, 172; 574/265

[56] References Cited

U.S. PATENT DOCUMENTS

| | | | |
|---|---|---|---|
| 4,528,390 | 7/1985 | Kimura | 556/480 |
| 5,552,466 | 9/1996 | Beckley et al. | 524/265 |

FOREIGN PATENT DOCUMENTS

| | | | |
|---|---|---|---|
| 1941629 | 3/1977 | U.S.S.R. | C08L 83/04 |
| WO 9707156 | 2/1997 | WIPO | C08G 77/16 |
| WO 9707164 | 2/1997 | WIPO | C08L 83/06 |

OTHER PUBLICATIONS

Kim et al., Thermal and Flammability Properties of poly(p–phenylene–benzobisoxazole), Journal of Fire Sciences, vol. 11, pp. 296–307, 1993.

Sastri et al., Flammability Characteristics of Phthalonitrile composites, 42nd International SAMPE Symposium, pp. 1032–1038, 1997.

Chao et al., Development of Silicone Resins for use in Fabricating Low Flammability Composite Materials, Proc. 42nd International SAMPE, vol. 42, pp. 1355, 1997.

*Primary Examiner*—Richard Weisberger
*Attorney, Agent, or Firm*—Catherine U. Brown

[57] ABSTRACT

A polymer matrix composite comprises a matrix of a cured methylsilsesquioxane resin and a reinforcing material. The composite has low heat release rate, smoke yield, and carbon monoxide yield when burned. After burning, the composite has high char yield and retains much of its initial tensile strength. The method for making the composite comprises applying a silanol-functional methylsilsesquioxane resin comprising 70 to 90 mol % (($CH_3$)$SiO_{3/2}$) units and 10 to 25 mol % ($CH_3Si(OH)O_{2/2}$) units to a reinforcing material and curing the resin.

20 Claims, No Drawings

SILICONE RESIN COMPOSITES FOR FIRE RESISTANCE APPLICATIONS AND METHOD FOR FABRICATING SAME

This invention was made with United States Government support under Grant Number 95-G-05 1 from the Federal Aviation Administration. The United States Government has certain rights in the invention.

FIELD OF THE INVENTION

This invention relates to composites for use in fire resistance applications. More particularly, this invention relates to composites with methylsilsesquioxane resins as their matrix. The composites have low heat release rates and low smoke and CO yields when burned.

BACKGROUND OF THE INVENTION

Polymer matrix composites containing organic resins and reinforcing materials are known in the art for fire resistance applications. For example, Kim et al. Thermal and Flammability Properties ofPoly(p-phenylene-benzobisoxazole), *Journal of Fire Sciences*, vol. 11, pp. 296–307, 1993 disclose a composite of poly(p-phenylene-benzobisoxazole) (PBO) and carbon fibers. The composite had peak heat release rates of 0 under a heat flux of 50 kW/sq. m; 100 under a heat flux of 75 kW/sq. m; and 153 under a heat flux of 100 kW/sq. m. However, PBO begins to thermally decompose at 660° C.

Sastri et al. *Flammability Characteristics ofPhthalonitrile Composites*, $42^{42}$nd International SAMPE Symposium pp. 1032–1038, 1997 disclose a composite comprising phthalonitrile polymer reinforced with glass fabric. The composite has a peak heat release rate of 106 kW/sq. m when exposed to 100 kW/sq. m heat flux. However, char yield of the phthalonitrile resins was 65 to 70 wt % upon pyrolysis to 1000° C.

When composites with silicone resins burn, they typically have a lower heat release rate and lower yields of carbon monoxide, and smoke than composites made with organic polymers.

For example, in *Development of Silicone Resins for use in Fabricating Low Flammability Composite Materials*, Proc. 42 Int. SAMPE, vol. 42, page 1355, 1997; Chao et al. disclose silicone resins comprised of the units $PhSiO_{3/2}$ and $ViMe_2SiO_{1/2}$ or $MeSiO_{1/2}$ and $ViMe_2SiO_{1/2}$ (where Ph represents a phenyl group, Vi represents a vinyl group, and Me represents a methyl group). Composites made from these resins and various fillers had lower smoke and carbon monoxide yields as compared to composites made with organic resins. However, these composites still had unacceptably high peak heat release rates (up to 150 kW/sq. m) when exposed to an incident heat flux of 50 kW/sq. m.

Russian Patent SU1941629 assigned to Vargina R A discloses a carbon fiber reinforced press molding obtained from a polymethylsilsesquioxane, polydimethyl methyl phenyl siloxane, and a hydride catalyst. The molding resists thermal oxidation and has good physico-mechanical properties.

U.S. Pat. No. 5,552,466 issued on Sep. 3, 1996, to Beckley et al. discloses a silicone composite with high temperature resistance. The composite is made from a blend of at least one silsesquioxane polymer with a viscosity of at least 500,000 mPa s at 25° C. and at least one polydiorganosiloxane component with a viscosity of 10 to 1,000 mPa s at 25° C. However, no composites are known in the art using the unblended methylsilsesquioxane resin as the matrix.

Therefore, it is an object of this invention to provide a polymer matrix composite with a methylsilsesquioxane resin that has high char yield and retains much of its mechanical strength after burning. Another object of this invention is to provide a method for fabricating the composite.

SUMMARY OF THE INVENTION

This invention relates to a polymer matrix composite with a methylsilsesquioxane resin as the matrix. This invention further relates to a method for fabricating the composite. The composite produced can be used in structural applications where fire is of concern, such as interiors of airplanes, offshore oil platforms, automobiles, trains, and infrastructures. The composite has a low peak heat release rate and low smoke and carbon monoxide yields when burned. The composite retains much of its tensile strength after burning.

DETAILED DESCRIPTION OF THE INVENTION

The composite of the present invention comprises:
(a) a matrix comprising a methylsilsesquioxane resin; and
(b) a reinforcing material.

The amount of matrix in the composite is typically 30 to 80, preferably 40 to 50% by volume. The methylsilsesquioxane resin is obtained by curing a silanol-functional methylsilsesquioxane resin.

Silanol-functional methylsilsesquioxane resins are known in the art. For example, PCT Patent Application Numbers WO 9707156 and WO 9707164, both published on Feb. 27, 1997 and hereby incorporated by reference, disclose a silanol-functional methylsilsesquioxane resin and a method for its preparation and cure. The process comprises hydrolyzing a methyltrihalosilane of the formula $MeSiX_3$, where Me represents a methyl group and X represents a halogen atom selected from Cl, F, Br, and I; and subjecting the hydrolysis product to a two-phase condensation reaction with water and a compound selected from the group consisting of an oxygen-containing organic solvent and an oxygen containing organic solvent mixed with less than 50 percent by volume of a hydrocarbon solvent.

Silanol-functional methylsilsesquioxane resins are commercially available. For example, Gelest 3M02, Wacker MK, and Shin Etsu KR220L are suitable for the present invention.

The silanol-functional methylsilsesquioxane resin used in this invention comprises $(CH_3)SiO_{3/2}$ and $CH_3Si(OH)O_{2/2}$ units. Typically, the resin contains 70 to 90 mol % $(CH_3)SiO_{3/2}$ units, preferably 75 to 85 mol %. The resin contains 10 to 25, preferably 15 to 25, mol % $CH_3Si(OH)O_{2/2}$ units, wherein the amount of $(CH_3)SiO_{3/2}$ and $CH_3Si(OH)O_{2/2}$ units in the resin equals 100 mol %. The resin has a number average molecular weight of 200 to 200,000, preferably 380 to 2,000. The resin is soluble in polar organic solvents. The resin does not contain units having silicon-bonded organofunctional groups with more than 1 carbon atom, such as phenyl or vinyl groups.

Silanol-functional methylsilsesquioxane resins cure by condensation reaction. The reaction may be uncatalyzed or catalyzed by an acid, base, or neutral catalyst. For example, zinc octolate, tin octoate, and titanium butoxide are suitable as catalysts. The temperature of the condensation reaction is typically 100 to 250° C.

The methylsilsesquioxane resin comprises $(CH_3)SiO_{3/2}$ units and and up to 1 mol % residual $CH_3Si(OH)O_{2/2}$ units.

The matrix of this composite may contain 0.1 to 50% by volume of optional ingredients. For example, 0.1 to 50% by volume of an additive selected from the group consisting of fire retardants, ultra-violet protectants, viscosity stabilizers, and combinations thereof may be added to the matrix. Suitable fire retardants include silicas, such as powdered or fumed silica; layered silicates; aluminum hydroxide; and brominated fire retardants.

Another optional ingredient is a toughening agent present in an amount 0.1 to 20% by volume of the matrix. Toughening agents prevent the composite from becoming brittle when the silanol-functional methylsilsesquioxane resin cures. Toughening agents are preferably rubber compounds.

The amount of reinforcing material, (b), in the composite will vary depending on the type and form of reinforcing material. However, the amount of reinforcing material is typically 20 to 70, preferably 50 to 65% by volume in the composite.

The reinforcing material can be a filler, such as a particulate exemplified by silica powder. However, the reinforcing material is preferably a fiber.

Suitable fibers include carbon/graphite; boron; quartz; aluminum oxide; organic; glass such as E glass, S glass, S-2 glass® or C glass; and silicon carbide or silicon carbide fibers containing titanium. Commercially available fibers that are suitable for the present invention include: organic fibers, such as KEVLAR™; aluminum oxide-containing fibers, such as NEXTEL™ fibers from 3M; silicon carbide fibers, such as NICALON® from Nippon Carbon; and silicon carbide fibers containing titanium, such as TYRRANO® from Ube. Carbon and glass fibers are preferred because of their low cost. When the reinforcing material is a fiber, it is typically present at 20 to 70, preferably 50 to 65, % by volume of the composite.

The fibers may be sized or unsized. When the fibers are sized, the sizing on the fibers is typically a layer 100 to 200 nm thick. When glass fibers are used, the sizing can be, for example a coupling agent, lubricant, or anti-static agent.

The fiber reinforcement can have various forms. The fibers can be continuous or discontinuous, or combinations thereof. Continuous strand roving can be used to fabricate unidirectional or angle-ply composites. Continuous strand roving can also be woven into fabric or cloth using different weaves such as plain, satin, leno, crowfoot, and 3-dimensional. Other forms of continuous fiber reinforcement are exemplified by braids, stitched fabrics, and unidirectional tapes and fabrics.

Discontinuous fibers suitable for this invention include milled fibers, whiskers, chopped fibers, and chopped fiber mats. When the reinforcing material is discontinuous, it is typically added in an amount of 20 to 60, preferably 20 to 30% by volume of the composite. Examples of suitable discontinuous reinforcing materials include milled or chopped fibers, such as glass and calcium silicate fibers. The preferred discontinuous reinforcing material is a milled fiber of calcium silicate (wollastonite; Nyad G Special®).

A combination of continuous and discontinuous fibers may be used in the same composite. For example, a woven roving mat is a combination of a woven roving and a chopped strand mat, and it is suitable for this invention.

A hybrid comprising different types of fibers may also be used in this invention. For example, layers of different types of reinforcement may be used. In aircraft interiors, the reinforcing material preferably comprises a fiber and a core, such as a Nomex™ honeycomb core, or a foam core made of polyurethane or polyvinylchloride.

The composite may have a coating on its surface. The coating can be an acrylate material used to prevent ultra-violet degradation (for example, due to sunlight) of the composite. The coating may also be an abrasion-resistant coating or a chemical resistant-coating.

This invention further relates to a method for fabricating a composite comprising the steps of: applying a matrix composition comprising a silanol-functional methylsilsesquioxane resin to a reinforcing material; and curing the resin.

The method for applying the matrix composition to the reinforcing material is not critical. The matrix composition can be applied by solventless processing or by solvent assisted processing. Solventless processing is preferred.

Solventless processing can be carried out continuously or non-continuously. Continuous solventless processing can be performed by drawing a continuous fiber through a bath containing melted resin. A discontinuous fiber can be sheet molded by placing the discontinuous fiber over a thin layer of molten resin on a release film, and then another layer of release film placed on top. The layers can then be moved through a set of squeeze rolls to mix the resin and the fibers. Non-continuous solventless processing is exemplified by putting a reinforcing material into a mold and adding resin to the mold. The resin can be added to an open mold, or the resin can be injected into a closed mold.

Alternatively, the method of applying the matrix composition to the reinforcing material may be solvent assisted. The silanol-functional methylsilsesquioxane resin can be dissolved in a solvent to form a solution and the solution used in the methods described above. Suitable solvents are exemplified by acetone, methyl ethyl ketone, methyl isobutyl ketone, toluene, and isopropyl alcohol. When a solvent is used, the solution typically contains 40 to 70, preferably 50 to 60% by weight of resin.

When solvent assisted processing is used, the solvent is removed before curing. The solvent may be removed by heating to a temperature below that temperature required to cure the resin, or by allowing to stand at ambient temperature for up to 24 hours. The amount of solvent left after the removal step is typically 2 to 3% by weight of the matrix composition. Preferably, solvent content is reduced as low as possible. If residual solvent content is higher than 3%, undesirable voids may form when the resin cures.

The silanol-functional methylsilsesquioxane resin cures by condensation reaction. Typically, the composite is cured by heating at 200 to 250, preferably 220 to 232° C., at a pressure of 0.7 to 1 MPa. The resin may optionally be post-cured by heating to a temperature of 250 to 275, preferably 250 to 260° C. Typically, post curing is carried out by heating for 5 to 20 hours, preferably 12 to 16 hours.

The silanol-functional methylsilsesquioxane resin of the present invention is suitable for use in methods known in the art for fabricating composites, such as pre-pregging the fiber with the resin, and subsequently autoclaving the pre-preg; filament winding; pultrusion; matched die molding; resin transfer molding, and vacuum assisted resin transfer molding.

The composites prepared according to this invention typically have the following properties when exposed to an incident heat flux of 50 kW/sq. m: smoke yields (extinction coefficient) of less than 1 l/m; CO yields of less than 0.02%, preferably less than 0.01% by volume based on the volume of the exhaust gas; and peak heat release rates of less than 20, preferably less than 10 kW/sq. m. After burning, the composites typically retain at least 46, preferably at least 78% of their original tensile strength and have char yields of 98% by weight or more, preferably 99% by weight or more.

EXAMPLES

These examples are intended to illustrate the invention to those skilled in the art and should not be interpreted as limiting the scope of the invention set forth in the claims.

ASTM E 1354 was used to test heat, carbon monoxide (CO), and smoke release rates in these examples. In general, ASTM E 1354 consists of placing a sample in a specimen holder at room temperature. The sample is then burned in ambient air flow while being subjected to an external heat flux of 50 kW/sq. m from a conical radiant electric heater. The samples are subjected to the heat flux for 600 to 1,200 seconds. Properties of the exhaust gas from the heater are then measured. The amount of oxygen consumed was calculated based on oxygen composition measured by a paramagnetic analyzer and flow rate of the exhaust gas measured by an orifice meter. The heat release rate is calculated (kW/sq. m) based on oxygen consumption over time. Peak heat release rate is the highest heat release rate obtained in the time the sample is exposed to the heat flux. CO yield was obtained by measuring CO content of the exhaust gas using a carbon monoxide detector. Peak CO yield is the highest CO yield measured in the time the sample is exposed to the heat flux.

Smoke yield is expressed as extinction coefficient (l/m). Smoke yield was obtained using a smoke obscuration measuring system comprising a helium-neon laser, silicon photodiodes as main beam and reference detectors, and associated electronics for determining extinction coefficient. Peak smoke yield is the highest smoke yield measured over the time the sample is exposed to the heat flux. The system is attached to the exhaust duct from the heater.

Comparative Example 1

Three silsesquioxane resins were burned in a cone calorimeter according to ASTM E 1354.

Sample C1-1 was a phenylsilsesquioxane resin, 3P01 manufactured by Gelest. Sample C1-1 was cured by heating at 200° C. for 16 hours.

Sample C1-2 was an uncured phenylsilsesquioxane resin (Gelest 3P01). This resin had a number average molecular weight of 1161.

Sample C1-3 was an uncured methylsilsesquioxane resin with 81 mol % ($(CH_3)SiO_{3/2}$) units and 16 mol % ($CH_3Si(OH)O_{2/2}$) units. The resin has a number average molecular weight (Mn) of 3,900.

Each sample was crushed into a powder and placed in a cone calorimeter under ambient air conditions. The specimens were burned by exposure to an external heat flux of 50 kW/sq. m for 800 to 1,100 seconds. Oxygen concentration and exhaust gas flow rate were measured. Peak heat release rate was then calculated.

Peak heat release rates for each sample are in Table 1.

Example 1

Peak heat release rates of four samples of cured methylsilsesquioxane resins were measured according to ASTM E 1354 as in Comparative Example 1, except that the samples were burned for 1,000 seconds. All samples were cured by heating at 200° C. for 16 to 18 hours.

Sample 1-4 was a cured methylsilsesquioxane with ($(CH_3)SiO_{3/2}$) and ($CH_3Si(OH)O_{2/2}$) units. Before curing, the resin had 81 mol % ($(CH_3)SiO_{3/2}$) and 16 mol % ($CH_3Si(OH)O_{2/2}$) units, and a number average molecular weight (Mn) of 3,900. Silanol content after cure was less than 1 mol %.

Sample 1-5 was 3M02 manufactured by Gelest. Before curing, the resin had 75 mol % ($(CH_3)SiO_{3/2}$) and 20 mol % ($CH_3Si(OH)O_{2/2}$) units, and Mn of 2859.

Sample 1-6 was MK manufactured by Wacker, and it had Mn of 3457 before curing.

Sample 1-7 was KR220L manufactured by Shin Etsu, and it had Mn of 2418 before curing.

Peak heat release rates for each sample are in Table 1.

TABLE 1

| Peak Heat Release Rates (kW/sq. m) for Different Resins | | | | | | | |
|---|---|---|---|---|---|---|---|
| Spl | C1-1 | C1-2 | C1-3 | 1-4 | 1-5 | 1-6 | 1-7 |
| Rate | 100 | 130 | 85–90 | 10–20 | 20 | 30–40 | 40 |

The different cured methylsilsesquioxane resins had comparable heat release rates. However, uncured methylsilsesquioxane resins and both cured and uncured phenylsilsesquioxane resins had unacceptably high peak heat release rates.

Example 2

A composite sample was prepared using as a matrix, a cured resin with ($(CH_3)SiO_{3/2}$) units and less than 1 mol % ($CH_3Si(OH)Ohd\ 2/2$) units.

The reinforcing material used was milled calcium silicate fiber (wollastonite, Nyad G Special®).

The composite was prepared by the following method: 5.6 g of uncured resin and 16 g of the milled fiber were mixed well by a shaker. The uncured resin had 85 mol % ($(CH_3)SiO_{3/2}$) units and 15 mol % ($CH_3Si(OH)O_{2/2}$) units.

The mixture was then cured by hot-pressing into a 5×5× 0.63 cm chase at 200° C. for 30 minutes, followed by a post-cure at 200° C. for 15 hours. The sample was burned in a cone calorimeter according to ASTM E 1354, under an incident heat flux of 50 kW/sq. m.

The peak heat release rate was 16.8 kW/ sq. m. After burning, the composite showed no cracking.

Example 3

Two composite samples were fabricated using a silanol-functional methylsilsesquioxane resin with 81–82 mol % ($(CH_3)SiO_{3/2}$) units and 16–17 mol % ($CH_3Si(OH)O_{2/2}$) units, and a number average molecular weight (Mn) of 3,900 before curing.

The first sample, 3-1, was reinforced with heat-treated 8-harness satin weave, style 7781, E-glass fabric. (E-glass is a commercially available electrical grade fiber.) The fabric was obtained from Clark Schwebel Company and had the following properties: weight: 303 g/sq. m; thickness of 0.23 mm. The glass fabric was unsized.

The second sample, 3-2, was reinforced with heat treated ceramic grade 8-harness satin weave silicon carbide fabric. The silicon carbide fabric had a weight of 380 g/sq. m. The silicon carbide fabric was initially sized with polyvinylacetate, and was heat treated to remove the sizing before fabricating the composite.

The samples were each fabricated by the following method: a pre-preg was prepared by dipping the fabric in a solution containing 60 wt % resin in acetone and drying overnight on corrugated aluminum foils in a fume hood at ambient conditions. Sample 3-1 contained approximately 40.5 wt % resin. Sample 3-2 contained approximately 47.9 wt % resin.

Example 4

Sample 3-1 was cut into 24 pieces (22.9 cm×11.5 cm). Sample 3-1 was cut into 20 pieces (22.9 cm×12.7 cm). The pieces of each sample were stacked by hand to form lay-ups. Each piece in the lay-up was arranged so that the warp direction was parallel to that of the other pieces.

The two lay-ups, all warps parallel, were placed in the same vacuum bag side by side and cured in an autoclave at 232° C. and 1 MPa for 6 hours using a combined de-bulk and cure cycle. Bleeder cloths were used in the vacuum bag to remove excess resin. The de-bulk and cure cycle is as follows:
(a) Heat to 132° C. at 1° C./min. and hold for 30 min. Increase pressure to 207 kPa.
(b) Heat to 121° C. at 1° C./min. and hold for 2 hours.
(c) Increase pressure to 1 MPa and then heat to 232° C. at 1° C./min.
(d) Hold at 1MPa and 232° C. for 6 hours.
(e) Cool down and reduce pressure.

The samples were then post-cured at 260° C. for 16 hours. Sample 4-1 was the 24-ply glass/resin composite, and it was 0.5 cm thick and contained approximately 56% fiber by volume. Sample 4-2 was the 20-ply silicon carbide/resin composite, and it was 0.71 cm thick and contained approximately 42% fiber by volume.

Example 5

Each sample from Example 4 was cut into two 10 cm×10 cm pieces. The pieces reinforced with glass fabric are designated samples 5-1A and 5-1B. The pieces reinforced with silicon carbide fibers are designated 5-2A and 5-2B.

Samples 5-1A and 5-2A were weighed and then burned in the cone calorimeter according to ASTM E 1354. The composites were burned by exposure to an external heat flux of 50 kW/sq. m for 600 to 1,200 seconds. Oxygen concentration and exhaust gas flow rate were measured. Peak heat release rate was calculated from the oxygen concentration and exhaust gas flow rate. Peak CO yield and peak smoke yield was also measured.

The samples were weighed after burning. Char yield was calculated based on the weight of the samples before and after burning.

Char yields and peak heat release rates, peak CO yields, and peak smoke yields are reported in Table 2.

Samples 5-1B and 5-2B were not burned.

TABLE 2

Properties of Burned Composites

| Sample | Composite 5-1A | Composite 5-2A |
|---|---|---|
| Peak Heat Release Rate (kW/sq. m) | less than 10 | less than 10 |
| CO Yield (%) | less than 0.01 | less than 0.01 |
| Smoke Yield (1/m) | less than 1 | less than 1 |
| Char Yield | 98% | 98% |

Example 6

The mechanical properties of the burned and unburned composite samples from Example 5 were tested. Each sample was nominally 10 cm long and 1.27 cm wide. Tapered end-tabs, 2.54 cm long, were bonded to the samples with epoxy adhesive resulting in 5.1 cm gage length. These samples were subjected to tension tests in the warp direction using an Instron test frame with crosshead speed of 0.04 cm/min. Mechanical wedge action grips with serrated gripfaces were used. The test results are presented in Table 3.

TABLE 3

Tensile Strength of Burned and Unburned Composites

| Sample | Tensile Strength, MPa | % Retained After Burning |
|---|---|---|
| Composite 5-1A | 2.0 | 46.8 |
| Composite 5-1B | 4.1 | |
| Composite 5-2A | 4.7 | 78.0 |
| Composite 5-2B | 6.0 | |

We claim:
1. A composite comprising
   (a) 30 to 80% by volume of a matrix consisting essentially of:
      a methylsilsesquioxane resin consisting essentially of $((CH_3)SiO_{3/2})$ units and up to 1 mol % of $(CH_3Si(OH)O_{2/2})$ units, and
   (b) 20 to 70% by volume of a reinforcing material.
2. The composite of claim 1, wherein the matrix comprises 40 to 50% by volume of the composite.
3. The composite of claim 1, wherein the matrix further comprises 0.1 to 50% by volume of an additive selected from the group consisting of fire retardants, ultra-violet protectants, viscosity stabilizers, and combinations thereof.
4. The composite of claim 3, wherein the additive is a fire retardant selected from the group consisting of powdered silica, fumed silica, layered silicates, aluminum hydroxide, and brominated fire retardants.
5. The composite of claim 1, wherein the matrix further comprises 0.1 to 20% by volume of a toughening agent.
6. The composite of claim 5, wherein the toughening agent is a rubber.
7. The composite of claim 1, wherein the reinforcing material is selected from the group consisting of fillers, hybrids, and discontinuous fibers, continuous fibers, and combinations thereof.
8. The composite of claim 7, wherein the reinforcing material is a discontinuous fiber selected from the group consisting of chopped and milled fibers, and it is present at 20 to 60% by volume of the composite.
9. The composite of claim 8, wherein the reinforcing material is a milled calcium silicate fiber present at 20 to 30% by volume of the composite.
10. The composite of claim 7, wherein the reinforcing material is a continuous fiber selected from the group consisting of glass, carbon, and silicon carbide fibers.
11. The composite of claim 1, wherein the composite retains 46 to 78% of its initial tensile strength after burning by exposure to an incident heat flux of 50 kW/sq. m for 600 to 1,200 seconds.
12. The composite of claim 1, wherein the composite has 98%, or higher, char yield after burning by exposure to an incident heat flux of 50 kW/sq. m for 600 to 1,200 seconds.
13. The composite of claim 1, wherein the composite has a peak heat release rate of less than 20 kW/sq.m when burned by exposure to an incident heat flux of 50 kW/sq. m for 600 to 1,200 seconds.
14. A method for fabricating a composite comprising
   1) applying to a reinforcing material, a matrix composition consisting essentially of a silanol-functional methylsilsesquioxane resin comprising 70 to 90 mol % $(CH_3)SiO_{3/2}$ units, and 10 to 25 mol % $CH_3Si(OH)_{2/2}$ units;
   wherein the silanol-functional methylsilsesquioxane resin has a number average molecular weight of 200 to 200,000; wherein the amount of $(CH_3)SiO_{3/2}$ and

$CH_3Si(OH)O_{2/2}$ units in the resin equals 100 mol %; and wherein the reinforcing material comprises 20 to 70% by volume of the composite; and 2) curing the silanol-functional methylsilsesquioxane resin.

15. The method of claim 14, wherein the silanol-functional methylsilsesquioxane resin contains 15 to 25 mol % $CH_3Si(OH)O_{2/2}$ units.

16. The method of claim 14, wherein the silanol-functional methylsilsesquioxane resin cures by heating to a temperature of 200 to 250° C.

17. The method of claim 14, wherein the matrix composition is dissolved in a solvent in order to apply it to the reinforcing material, and the solvent is removed sufficiently that up to 3% solvent is present during cure.

18. The method of claim 14, wherein the matrix composition further comprises 0.1 to 50% by volume of an additive selected from the group consisting of fire retardants, ultraviolet protectants, viscosity stabilizers, and combinations thereof.

19. The method of claim 14, wherein the matrix composition further comprises 0.1 to 20% by volume of a toughening agent.

20. The method of claim 14, further comprising: 3) post-curing the composite by heating to a temperature of 250 to 275° C.

* * * * *